April 23, 1963  J. M. LAFFERTY  3,087,092
GAS GENERATING SWITCHING TUBE
Filed May 10, 1961
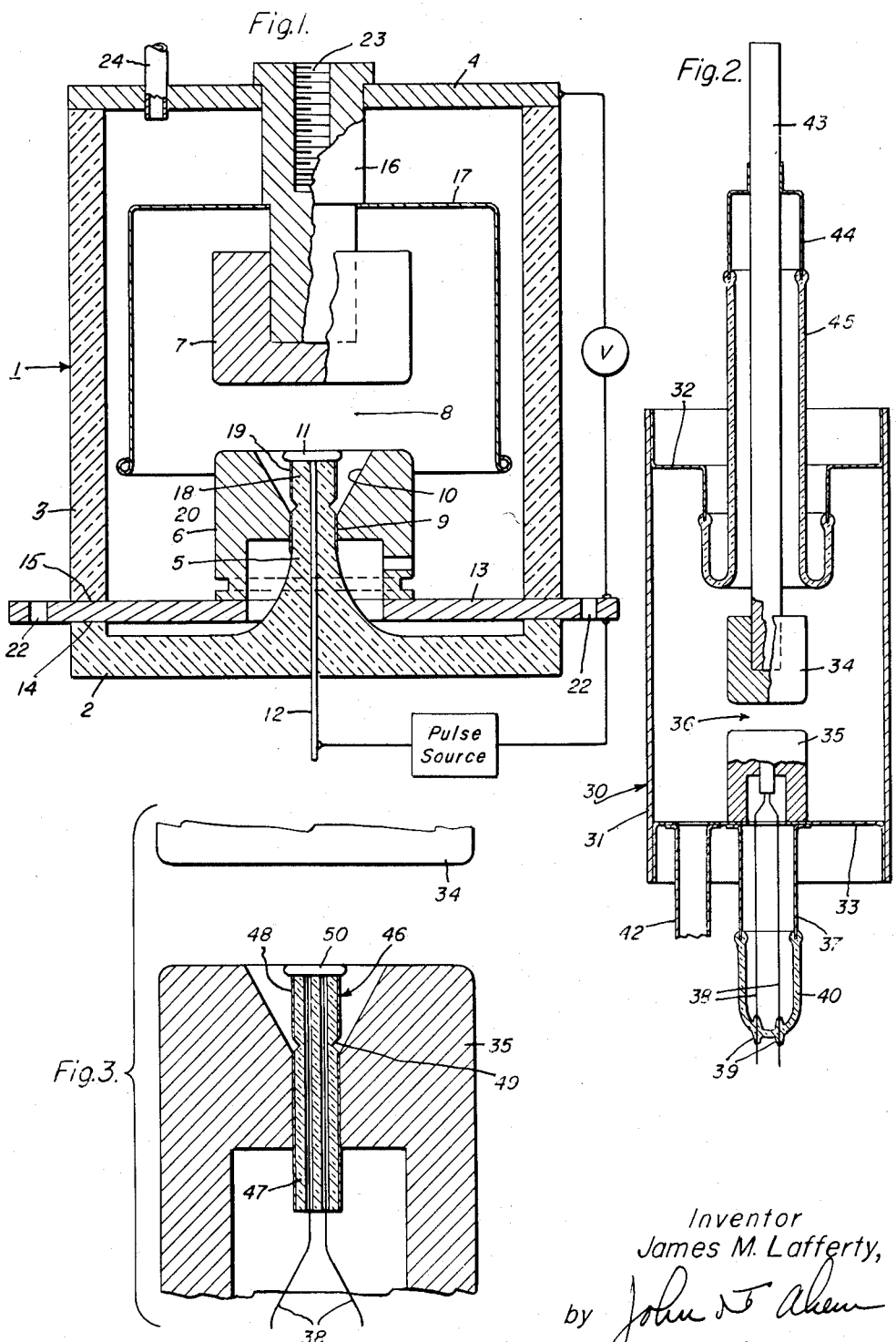
Inventor
James M. Lafferty,
by John F. Ahern
His Attorney.

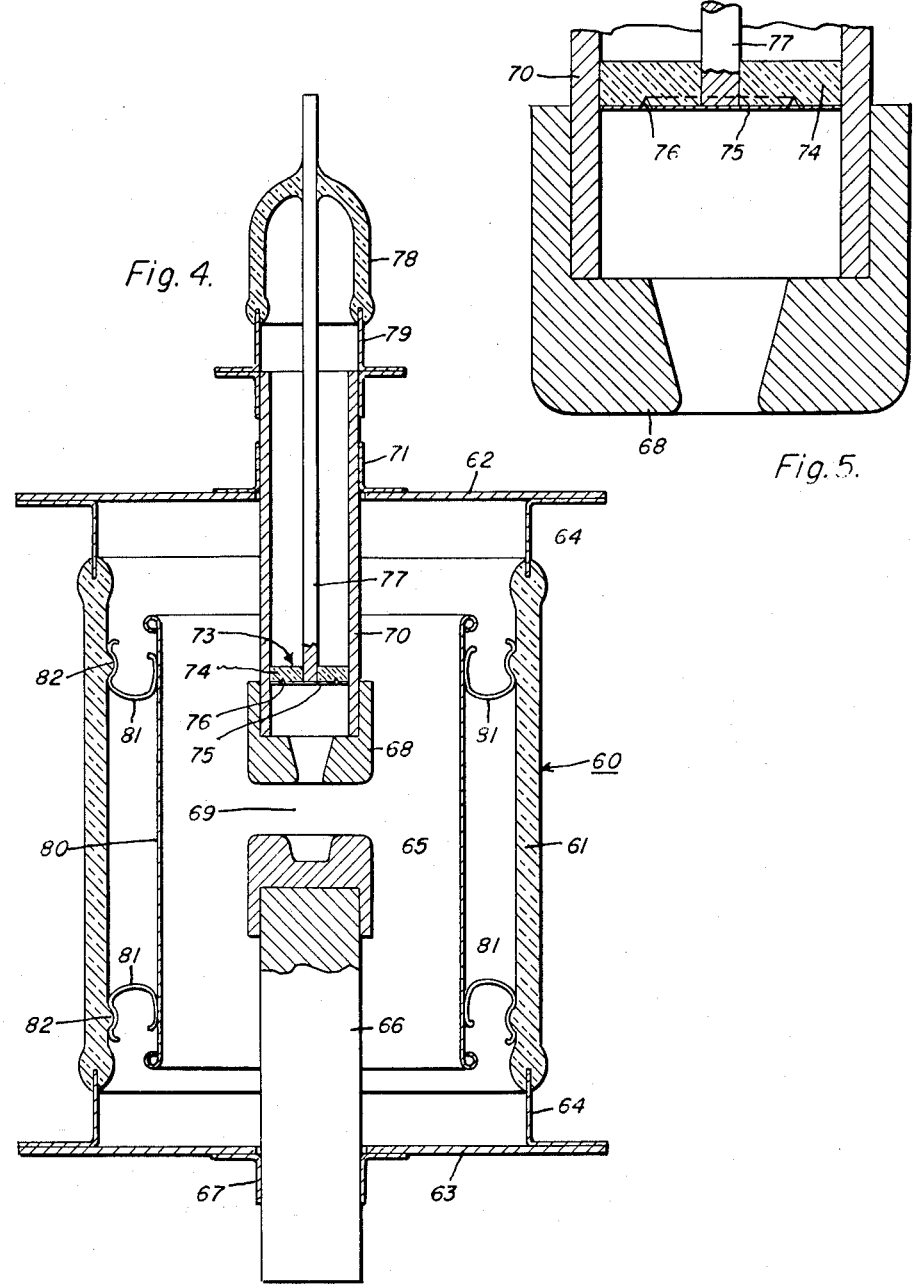

United States Patent Office 3,087,092
Patented Apr. 23, 1963

3,087,092
GAS GENERATING SWITCHING TUBE
James M. Lafferty, Schenectady, N.Y., assignor to General Electric Company, a corporation of New York
Filed May 10, 1961, Ser. No. 109,089
12 Claims. (Cl. 315—330)

The present invention relates to electric discharge devices adapted to switch high voltages and currents with speed and precision, and more particularly to such apparatus in which switching is accomplished by triggering electric breakdown between a pair of fixed electrodes separated by a gap in vacuo.

Gap switching devices are devices normally maintained in an open circuit condition which, when subjected to an appropriate signal, are switched to a closed circuit condition and pass electric current therethrough. Such devices are used to great advantage as overload protectors, lightning arresters and for the precision switching of extremely high voltages and currents, as for example, in discharging capacitor banks to obtain a very short pulse of extremely high current.

For these uses, gap discharge devices must be able to withstand high voltages and to break down or fire only when desired. They must be, for many applications, adapted to repeatedly fire, often thousands of times, in response to essentially the same breakdown conditions, with the same firing time. In other applications, as for example, when used as lightning arresters, it is imperative that such gap devices have an extremely short recovery time so as to be ready to function again a short time after firing.

Most prior art gaps discharge devices are charged with a gaseous atmosphere, often at super-atmospheric pressure. Although suitable for many applications, gaseous gap discharge devices usually have long recovery times, due to the necessity of ionized gases therein becoming de-ionized before full recovery is effected. Additionally, since the hold-off voltage of a gap discharge device is dependent upon the dielectric strength of the gas therein, gaseous gaps are often quite large when designed for use at high voltages.

Perhaps the greatest disadvantage of gaseous gap discharge devices, however, is due to the fact that with use, gas is removed or "cleaned-up" from the device by entrapment with deposited metallic particles which are sputtered from the electrodes of the gap. This "clean-up" changes the characteristic of the gap so that it does not perform reproducibly and the device must often be replaced long before actual failure.

Vacuum gap discharge devices have been proposed as a means to overcome many of these disdvantages. In theory, a vacuum gap discharge device would be smaller, due to the high dielectric strength of a vacuum; its recovery time would be much shorter; and, since there is no gas to be removed by sputtered metallic particles, a vacuum gap should not change its operating characteristics. In practice, however, prior art vacuum gap discharge devices have not proven to be reliable, either as to firing voltage, hold-off strength, or recovery time. In prior art vacuum spark gap devices, the operating characteristics seem to be a function of the device's past history, such as the time lapse since last firing.

It is a general object of the present invention to provide gap discharge devices which overcome one or more of the foregoing disadvantages.

A more specific advantage of the invention is to provide gap discharge devices adapted to reproducibly fire at preselected voltage conditions, and to rapidly recover to the prefiring condition.

Another object of the present invention is to provide gap discharge devices with reproducibly short firing times.

A further object of the invention is to provide improved gap discharge devices having stable, reproducible hold-off voltages, firing times and recovery times.

Still another object of the present invention is to provide improved gap discharge devices which are reliable in operation and which may be readily and inexpensively manufactured.

Briefly stated, in accord with my invention I provide a gap discharge device including an hermetically sealed envelope which is evacuated to a hard vacuum of $10^{-5}$ mm. of mercury pressure or less. Within the envelope I provide a pair of closely-spaced fixed electrodes fabricated from gas-free metal. Means are also provided, closely adjacent at least one electrode, to establish within the gap between the electrode a sufficient quantity of charged conduction carriers so as to cause the gap to break down at any preselected time.

In a preferred embodiment of my invention, the means for establishing charged conduction carriers within the gap includes a trigger gap of which one electrode is a metallic member such as titanium which may be charged with an ionizable gas such as hydrogen. When a discharge is initiated across the trigger gap in response to a pulsed signal, the ionizable gas is evolved from the charged metallic member and directed into the main gap, causing it to become conductive. In accord with another embodiment of the invention the discharge across the trigger gap is in the form of an arc which is propagated, by gap geometry and magnetic force into the main gap area to establish a cathode spot upon the cathode of the main or primary gap.

The novel features believed characteristic of the invention are set forth in the appended claims. The invention itself, together with further objects and advantages thereof may best be understood by reference to the following description, taken in connection with the appended drawings in which:

FIG. 1 is a vertical cross-sectional view of a gap discharge device constructed in accord with the present invention.

FIG. 2 is a vertical view, with parts in section, of an alternative embodiment of the invention.

FIG. 3 is a vertical cross-sectional view of the cathode structure of the device of FIG. 2, FIG. 4 is a vertical cross-sectional view of still another embodiment of the invention, and FIG. 5 is a vertical cross-sectional view of the cathode structure of the device of FIG. 4.

In FIG. 1 of the drawing, a gap discharge device constructed in accord with the present invention is presented in a vertical cross-sectional view. The device of FIG. 1 includes a gas-impervious insulating envelope 1 which is composed of a lower flanged disc end wall assembly 2, a cylindrical side wall member 3 and an upper end plate 4. Lower end plate assembly 2 includes an integral protruding member 5 which constitutes a portion of a trigger electrode assembly for the device. A pair of gap electrodes 6 and 7 are supported in spaced-apart relation within envelope 1 to define a primary gap 8. Cathode electrode 6 comprises a half cylindrical section having an apertured closed end. The aperture in cathode electrode 6 is tapered outwardly at the exterior portion thereof to provide a bore in the end of electrode 6 having an interior cylindrical portion 9 and an exterior portion 10. Electrode assembly 6 is fitted over the inwardly protruding end of member 5. The inward end of member 5 is capped with a metallic disc 11 which is slightly larger in diameter than the diameter of protruding member 5. A conducting lead 12 is soldered, brazed or otherwise firmly and conductively secured to cap 11 and passes through a bored aperture in end wall assembly 2 to the exterior of envelope 1. The side of cap 11 in contact with the inward end of member 5 is hermetically sealed thereto by conventional metal-to-insulator sealing techniques so as to maintain the hermetic seal of envelope 1. Cathode electrode 6 is suspended within envelope 1 upon the inner periphery of an annular copper disc 13 which rests upon the annular upwardly flanged edge of end wall assembly 2. Disc 13 is bonded to assembly 2 at 14 and to one end of cylindrical side wall assembly 3 at 15 so as to form hermetic seals therewith. Apertured disc end cap 4 is similarly bonded to the opposite end of cylindrical side wall assembly 3. Anode electrode 7 is suspended within envelope 1 by means of an anode electrode support member 16 which is passed through a central aperture in end cap 4 and hermetically sealed thereto by welding, brazing or other suitable techniques.

A metallic shield 17, having a semi-cylindrical shape with a flared open end to prevent arcing, is suspended from anode electrode support member 16 and extends past the mid-point of the gap between electrode 6 and 7. Shield 17 is utilized to preclude metal sputtered or evaporated from electrodes 6 and 7 from completely coating the inner surface of cylindrical side wall portion 3 of envelope 1 and thus destroying the insulating characteristics thereof.

The inner most, cylindrical portion 18 of inwardly protruding member 5 is coated with a thin layer 19 of a metal, such as titanium, which is a good getter for active gases such as hydrogen and which absorbs a large quantity thereof. After layer 19 of titanium has been formed a groove 20 is scored around the circumference of cylindrical portion 18 so as to remove the titanium therefrom and expose the insulating ceramic. The position of groove 20 is chosen so that, when cathode electrode 6 is positioned over member 5, the junction between the cylindrical bore 9 and the tapered bore 10 is slightly below the lower edge of groove 20.

Envelope members 2 and 3 may be fabricated from any gas-impervious, non-conducting material which may be hermetically sealed to a metal electrode. Generally, any gas-impervious ceramic may be utilized such as Coors V200 or American Lava T164. Alternatively, aluminum oxide or forsterite ceramic bodies may be used. It is to be understood, however, that although these specific materials have been enumerated, any gas-impervious ceramic or glass which may be hermetically sealed to metal members may also be utilized.

Electrodes 6 and 7 are fabricated from copper that is substantially free of all gaseous impurities or impurity which, upon decomposition, may produce gases. This copper is such that it meets a standard test, the criterion of which is such that when placed in a vacuumized test chamber, a few liters in volume, and subsequently deeply eroded by a repetitive arcing, as for example, by a voltage of commercial power and current of 100 amperes or more, the pressure level in the container, a few cycles after arcing, does not rise substantially from its initial value, in the absence of getters and pumps, even when the initial value is $10^{-5}$ mm. of mercury or lower. Analytically this requirement may be stated by the relationship that the contact material must contain less than $10^{-6}$ atomic parts of all gases.

Electrode support members 13 and 16 need not meet this stringent requirement since they are not brought into contact with an electric arc and therefore are not potential sources of vacuum-spoiling gases. They should neverthless be of copper which is completely free of oxygen, since, in fabrication, the device is subjected to hydrogen at elevated temperatures and it is undesirable to have oxygen as an impurity in any material exposed at high temperatures to a hydrogen atmosphere.

In fabricating the apparatus of FIG. 1, the individual constituents are prepared, the cylindrical portion of protruding member 5 of lower end wall member 2 is coated with titanium, as for example, by vacuum evaporation, or painting with titanium hydride and firing, and groove 20 is cut therein. Titanium coating 19 may exist in varying thicknesses from approximately 0.001″ to 0.010.″ The thickness of the layer depends only upon the number of times the device is expected to fire. If it is to be utilized in an application in which only one or two firings are required, the layer may be quite thin. On the other hand, if the ability to withstand thousands of firings is required, then the upper limit of the listed range should be approached. This coating serves as a source of hydrogen and the thickness is governed by the amount of hydrogen which is stored therein.

In assembling the device of FIG. 1, the cathode assembly, including cathode electrode 6 and cathode support member 13, are fastened together, and fitted over coated member 5. After proper positioning of the cathode electrode with respect to the groove in member 5, end cap 11 and conducting pin 12 are placed in position and end cap 11 is hermetically sealed to the upper surface of protruding member 5. The anode assembly, including anode electrode 7, anode support member 16, shield 17, upper end wall member 4, are assembled. The anode assembly, the cathode and end wall assembly and cylindrical side wall 3 are assembled, with suitable solder shims or metallizing coatings between metal and ceramic members. The assembled members are placed in a suitable furnace and raised to a temperature of approximately 850° C. in a hydrogen atmosphere to cause hermetic to be formed between the various members. The device is then allowed to cool in the hydrogen atmosphere to allow coating 19 to become charged with hydrogen. After this is accomplished the device is exhausted to a hard vacuum of $10^{-5}$ mm. of Hg or less and preferably less than $10^{-6}$ mm. Hg by means of exhaust tubulation 24, which is then sealed.

The device of FIG. 1 is, of course, a vacuum gap device. Accordingly, all steps have been taken in order to insure that the space therein is initially evacuated to a pressure of $10^{-5}$ mm. of mercury or less and, that during operation, this pressure does not rise.

In the operation of the devices of this invention, it is imperative that a hard vacuum of $10^{-5}$ mm. of mercury or less be maintained at all times. It is for this reason that the electrodes are made of special gas-free copper. The reason for the necessity of the maintenance of this degree of low pressure of all gases is that any rise of pressure within envelope 1 results in the presence of ionizable gases. These gases become ionized during firing of the device. After extinction of the arc between the electrodes of the main gap, however, such ionized gases must be deionized before the gap recovers its recovery strength. These gaseous ions do not deionized with the speed with which the copper ions from the electrodes (which, together with electrons comprise the arc plasma) and hence the recovery time of the device depends strongly upon pressure. It has been found empirically that should the pressure within the device rise above $10^{-5}$ mm. of Hg the device recovery time increases to a value of greater than 1000 microseconds which is inacceptable in most multi-operation applications.

A further means for maintaining the requisite low pressure is the use of copper electrodes. During arcing metal is readily evaporated from the electrodes and deposits upon the device walls. While depositing this copper entraps any gaseous impurities which may cool during operation.

In the operation of the device of FIG. 1, metallic coating 19 upon cylindrical portion 18 of protruding member 5 constitutes a trigger electrode. Accordingly, a triggering circuit, which may conveniently include a suitable capacitor together with means for charging and discharging the same, or a pulse transformer or equivalent mechanism, is connected between conductor 12 and the periphery of cathode support disc 13. The voltage which is to be switched is connected between upper end disc 4 and cathode support disc 13. The specific configuration of the device of FIG. 1 is, however, designed for insertion into a cylindrical cavity and the fastening of cathode support disc 13 to a metallic member by bolting through holes 22. Similarly, connection to the anode electrode may be made by a bolt in threaded bore 23 within anode support member 16. The specific configuration of the exterior of the envelope disclosed herein is not critical, rather, it is the electrode and associated structure that is of greatest importance.

In operation, a high voltage which may, for example, range from 3 to 100 kilovolts is connected between anode electrode 7 and cathode electrode 6. This voltage may be caused to be discharged through electrodes 6 and 7 with great accuracy and timing at any predetermined time by applying a trigger voltage which may vary from 50 volts to 10 kilovolts between trigger electrode 19 and cathode electrode 6, with the trigger electrode positive with respect to the cathode. When a trigger pulse is applied to trigger electrode 19, a spark discharge is initiated across groove 20. This discharge causes a heating of titanium film 19 and a consequent discharge of hydrogen into the vicinity of the arc. The hydrogen becomes ionized and a highly conducting arc exists between the opposite side of groove 20. Because of the magnetic forces applied to this arc, it is rapidly propagated upwardly along the tapered inner edge of cathode electrode 6 until it reaches the edge thereof and establishes a cathode spot along the portion of cathode 6 that is parallel with the mating surface of anode 7. Since the electric field between the cathode and anode electrodes is much greater than the field established by the triggering pulse (which is applied to trigger electrode 19), the arc transfers to anode 7 and the main gap breaks down and conducts high currents which are limited only by the external circuit, but which may be in the range of thousands of amperes.

After the useful purpose of the passage of current between cathode 6 and anode 7 has passed, as for example, after a capacitor bank has been discharged a lightning bolt has been short-circuited or the first current-zero of an alternating overvoltage occurs, the potential difference between cathode and anode electrode drops essentially to zero and the arc is extinguished. Upon this extinction, the normal conduction carriers within the envelope disappear. These conduction carriers are essentially electrons and ionized copper atoms from the electrodes. The ions diffuse to the electrodes, the shield, or to one of the exposed side or end walls of the device and are deionized and removed from the envelope. The hydrogen ions from the trigger gap are essentially reabsorbed or gettered by the titanium film as soon as the arc is transferred from the trigger electrode to the anode electrode. Since the envelope is maintained to a hard vacuum and essentially no ionizable gases are present the gap rapidly recovers and is ready to perform a switching action almost immediately after the extinction of the arc between electrodes 6 and 7. Typical recovery times for devices constructed in accord with the present invention are from 25 to 100 microseconds after extinction of the arc.

The only modification which need be made in devices in accord with the invention depending upon the magnitude of the voltage to be switched, is the spacing of the arc gap. Generally, this spacing varies as the square of the voltage switched, with some typical values being: a ⅛" gap for switching 20 kilovolts; a ¼" gap for switching 30 kilovolts; and a ⅜" gap for switching 60 kilovolts.

In FIG. 2 of the drawing there is shown an alternative, improved embodiment of the invention which illustrates the modification of the envelope to a metallic envelope and modification of the trigger electrode structure. In FIG. 2, a spark gap apparatus includes an envelope, represented generally as 30, which comprises a cylindrical stainless steel member 31, an annular upper fernico flange 32 and an annular lower fernico flange 33. Anode electrode 34 and cathode electrode 35 are supported within envelope 30 to define a spark gap 36. Cathode electrode 35 is supported upon lower fernico flange 33. At the same position, a tubulation 37, also of fernico, extends outwardly away from envelope 30. This tubulation is to enclose a pair of trigger electrode heater wires 38 which are passed through glass-to-metal seals 39 through a glass tip 40 which is sealed to fernico tubulation 37. A second tubulation 42 also depends outwardly from envelope 30 adjacent cathode 35 and is utilized for exhaust purposes. Anode electrode 34 is suspended from an anode support rod 43 which is supported from a fernico header 44 which, in turn, is fastened to fernico flange 32 by a reentrant glass tubulation 45. Electrical contact to anode electrode 34 is made to the upper end of anode support member 43. Contact to cathode electrode 35 is made by a connection with stainless steel cylinder 31 comprising a portion of envelope 30. Connection to the trigger electrode (not shown) is made to trigger electrode heater wires 38.

In FIG. 3 of the drawing the details of the trigger and cathode electrodes are shown in detail. In FIG. 3 cathode 35 surrounds trigger electrode 46 which comprises a ceramic cylinder 47 having thereon a titanium film 48 which is grooved at 49 to form a trigger gap. Ceramic cylinder 47 is capped with a metallic disc 50 to which heater leads 38 are connected. This trigger electrode structure differs from the structure of the device of FIG. 1 in that the trigger electrode may be independently and separately heated. This is advantageous in that the selective heating of the trigger electrode allows for independent charging of titanium film 48 with hydrogen to activate the trigger electrode without heating the rest of the device. This permits baking-out of the device after the seals are made so that charging of the trigger electrode is the last step before evacuation. In accord with this mode of operation, the entire structure is fabricated, all seals are made, and the structure is baked out at a temperature of approximately 500° for a suitable time to remove all undesirable contaminating gases from the constituents thereof, while the envelope is evacuated to a suitable low pressure. The envelope is then filled with hydrogen gas and the trigger electrode heaters 38, which may conveniently be a 0.010" diameter tungsten wire, are connected to a suitable source of current, thus causing the trigger electrode to be heated to a temperature at which the titanium film actively absorbs a substantial quantity of hydrogen gas to activate the trigger electrode. After activation, the trigger electrode heaters are disconnected, the device is evacuated to a pressure of $10^{-5}$ mm. of mercury or less and tubulation 42 is sealed off, thus preparing the device for operation.

After fabrication, the operation of the device of FIGS. 2 and 3 is essentially the same as the operation of the device of FIG. 1. The high voltage to be switched is connected between cylinder 31 and anode support 43 and the trigger potential is applied between cylinder 31 and heater leads 38. A spark is first struck across groove 49, causing film 48 to evolve hydrogen with the attendant establishment of an arc between cathode 35 and trigger electrode 46 which rapidly expands outwardly and establishes a cathode spot upon the surface of cathode 46, parallel with anode 34. The discharge is transferred from trigger electrode 46 to anode 34 and the device switches, essentially as the device of FIG. 1.

In FIG. 4 of the drawings there is shown another embodiment of a trigger gap constructed in accord with the present invention. The device of FIG. 4 includes an evacuable envelope represented generally at 60 and including a cylindrical glass member 61 and a pair of oppositely disposed metallic end plates 62 and 63. These end plates are suitably fastened to the glass cylindrical member 61 by means of annular fernico flanges 64. An anode electrode 65 is suspended within envelope 60 by means of anode support member 66, which is hermetically sealed through disc 63 by means of a suitable annular flange 67. Cathode electrode 68 is supported adjacent anode electrode 65 so as to define a main gap 69 by a tubular cathode support member 70 which is hermetically sealed through disc end member 62 by means of flange 71. A trigger electrode assembly 73 is located concentrially within cathode support cylinder 70 and includes a ceramic disc 74 having thereupon a thin film of titanium 75 which is grooved at 76 to form a trigger gap. Trigger electrode lead 77 is hermetically sealed through a glass nipple 78, which is sealed to a fernico flange 79, to complete the hermetically sealed device. A shield 80 surrounds cathode and anode electrodes to prevent glass cylindrical envelope member 61 from becoming covered with metal evaporated from the electrodes 65 and 68 and thus becoming electrically short-circuited. Shield 80 is supported within glass cylindrical member 61 by springs 81 which ride upon annular ridges 82 on the interior surface of glass cylindrical member 61.

In operation, a voltage to be switched by the device is connected between anode support members 66 and cathode support member 70 or, alternatively, between disc end wall members 62 and 63 which are connected to the respective electrodes. The switching potential is applied between disc 62 and trigger electrode lead 77. Upon the application of this pulse, a spark discharge exists across annular gap 76, thus heating the titanium film and causing the evolution of a quantity of hydrogen gas. This hydrogen gas is propagated out through the orifice in cathode electrode and into the main gap causing the main gap to break down. This device possesses essentially the same recovery characteristics as is possessed by the device of FIGS. 1 and 3. It does not, however, have the advantage of establishing a cathode spot upon the cathode and hence, does not break down quite as rapidly as the devices of FIGS. 1 and 3. Its breakdown figures are, however, of the order of 1 microsecond and are quite acceptable for a number of applications.

In FIG. 5 of the drawing, the structure of cathode and trigger electrode structure assembly is shown in greater detail.

The trigger gaps in all embodiments of the invention are comprised of metallic films in intimate contact with ceramic bodies. As is well known in the art, the lines of field distribution at the interface between a metal and ceramic body in intimate contact are highly favorable to a breakdown at such an interface. Accordingly, it has been found empirically that the initiation of a discharge at these interfaces in the devices of the present invention may be achieved with a voltage as low as 50 volts.

The devices of the various embodiments set forth herein are ideally suited for the switching of high voltage, high current loads with microseconds speeds which are reproducable to a very slight error. Thus, for example, a typical device constructed in accord with the embodiment of FIG. 1 has been found to reproducibly switch a 30 kilovolt load at 0.27 microsecond±0.013 microsecond. This speed and accuracy is highly desirable, particularly in applications in which it is desired to simultaneously fire or discharge a number of capacitors to achieve a high current, high voltage discharge. Similarly, devices in accord with the present invention have been found ideally suited for many thousands of operations without any substantial deviation in recovery time, hold-off strength, or breakdown voltage. This is believed due to the fact that the vacuum gap is not subject to changes in these parameters due to clean-up of gas by deposition of sputtered metal. The devices constructed in accord with the present invention are, unlike prior art vacuum devices quite reliable and operate with reproducible parameters.

While the invention has been set forth herein with respect to certain embodiments thereof many modifications and changes will readily occur to those skilled in the art. Accordingly, I intend by the appended claims to cover all such modifications and changes as fall within the true spirit and scope of the invention.

What I claim as new and desire to secure by Letters Patent of the United States is:

1. An electric discharge device adapted to change from a non-conducting condition to a conducting condition with the application of a pulsed signal thereto and comprising: an hermetically sealed envelope evacuated to a pressure of $10^{-5}$ mm. Hg or less; first and second primary electrodes within said envelope spaced apart to form a gap therebetween; means for connecting said electrodes to a voltage source to cause an electric field to exist in the region of said gap; and means for injecting a concentration of charged conduction carriers into said gap in response to a pulsed signal independent of the voltage connected between said primary electrodes to cause said gap to break down and thereby render said device conducting.

2. An electric discharge device adapted to change from a non-conducting condition to a conducting condition with the application of a pulsed signal thereto and comprising: an hermetically sealed envelope evacuated to a pressure of $10^{-5}$ mm. Hg or less; first and second primary electrodes spaced apart within said envelope to form a gap therebetween; means for connecting said electrodes to a voltage source to cause an electric field to exist in the region of said gap; and means for establishing a concentration of charged conduction carriers in the vicinity of said gap in response to a pulsed signal independent of the voltage connected between said primary electrodes to cause said gap to break down and thereby render said device conducting.

3. An electric discharge device adapted to change from a non-conducting condition to a conducting condition with the application of a pulsed signal thereto and comprising: an hermetically sealed envelope evacuated to a pressure of $10^{-5}$ mm. Hg or less; a cylindrical cathode electrode and an anode electrode located within said envelope spaced apart from each other to form a primary gap therebetween; means for connecting said anode and cathode electrodes to a voltage source to establish an electric field in the vicinity of said gap; a trigger electrode located concentrically within said cathode electrode and separated therefrom by a trigger gap, said trigger electrode being charged with a quantity of gaseous material which is evolved therefrom upon the establishment of an electric discharge between said trigger electrode and said cathode electrode in response to a pulsed signal to cause the establishment of a concentration of charged conduction carriers in the vicinity of said primary gap to render said device conducting.

4. An electric discharge device adapted to change from a non-conducting condition to a conducting condition with the application of a pulsed signal thereto and comprising: an hermetically sealed envelope evacuated to a pressure of $10^{-5}$ mm. Hg or less; cathode and anode electrodes spaced apart within said envelope to form a primary gap therebetween; means for connecting said electrodes to a voltage source to cause an electric field to exist in the region of said primary gap; a trigger electrode disposed within said envelope and separated from said cathode electrode by an insulating space defining a trigger gap, said trigger electrode being charged with a quantity of hydrogen gas and being adapted to evolve said hydrogen gas into the vicinity of said primary gap upon the establishment of an electric breakdown between said trigger electrode and said cathode electrode in response to a pulsed signal.

5. An electric discharge device adapted to change from a non-conducting condition to a conducting condition with the application of a pulse signal thereto and comprising: an hermetically sealed envelope evacuated to a pressure of $10^{-5}$ mm. Hg or less; a centrally apertured cathode electrode and an anode electrode spaced apart within said envelope to form a primary gap therebetween; means for connecting said cathode and anode electrodes to a voltage source to establish an electric field in the vicinity of said primary gap; a trigger electrode located within said central aperture in said cathode electrode and spaced therefrom by a trigger gap, said trigger electrode comprising a thin film of charged gas-absorbing metal upon a ceramic body; means for applying a voltage pulse between said trigger electrode and said cathode electrode to cause the establishment of an electric breakdown across said trigger gap and the consequent evolution of gas from said trigger electrode to cause charged conduction carriers to be injected into said primary gap to render said device conducting.

6. The device of claim 5 wherein the gas-absorbing metal is titanium.

7. An electric discharge device adapted to change from a non-conducting condition to a conducting condition with the application of a pulsed signal thereto and comprising: an hermetically sealed envelope evacuated to a pressure of $10^{-5}$ mm. Hg or less; an apertured cathode electrode and an anode electrode spaced apart within said envelope to form a primary gap therebetween; a ceramic disc within said apertured cathode electrode disposed in a plane perpendicular to a longitudinal axis drawn through said cathode and said anode electrodes; a thin coating of a charged active gas-absorbing metal upon said ceramic, said coating being scored through to said ceramic to provide a pair of electrically insulated conducting films defining a trigger gap, one of said films being electrically connected to said cathode electrode and the other of said films being electrically connected to an external electrode lead; means for connecting said cathode and anode electrodes to a voltage source to establish an electric field in the vicinity of said primary gap; and means for connecting a source of pulsed voltage between cathode electrode and said trigger electrode.

8. The device of claim 7 wherein the gas-absorbing metal is titanium.

9. An electric discharge device adapted to change from a non-conducting condition to a conducting condition with the application of a pulsed signal thereto and comprising; an hermetically sealed envelope evacuated to a hard vacuum; a centrally apertured cathode electrode and an anode electrode spaced apart within said envelope to form a primary gap therebetween; means for connecting said cathode electrode and said anode electrode to a voltage source to establish an electric field in the vicinity of said primary gap; a trigger electrode located concentric within said apertured cathode electrode and comprising a cylindrical ceramic member having a charged film of gas-absorbing metal deposited upon the lateral surface thereof and scored circumferentially to provide a trigger gap between opposite portions of said scored film on either side of said circumferential scoring; means connecting one side of said trigger gap to said cathode electrode; means connecting the remaining side of said trigger gap to an external trigger electrode lead; and means for connecting a source of pulsed voltage between said cathode electrode and said trigger electrode lead.

10. The device of claim 9 wherein the gas-absorbing metal is titanium.

11. An electric discharge device adapted to change from a non-conducting condition to a conducting condition with the application of a pulsed signal thereto and comprising: an hermetically sealed envelope evacuated to a hard vacuum; a centrally apertured and inwardly tapered cathode electrode and an anode electrode spaced apart within said envelope to form a primary gap therebetween; means for connecting said cathode electrode and said anode electrode to a voltage source to establish an electric field in the vicinity of said primary gap; a trigger electrode located concentric within said apertured cathode electrode and comprising a cylindrical ceramic member having a charged film of gas-absorbing metal deposited upon the lateral surface thereof and scored circumferentially to provide a trigger gap between opposite portions of said scored film on either side of said circumferential scoring; means connecting one side of said trigger gap to said cathode electrode; means connecting the remaining side of said trigger gap to an external trigger electrode lead; and means for connecting a source of pulsed voltage between said cathode electrode and said trigger electrode lead.

12. An electric discharge device adapted to change from a non-conducting condition to a conducting condition with the application of a pulsed signal thereto and comprising: an hermetically sealed envelope evacuated to a hard vacuum; a centrally apertured cathode electrode and an electrode spaced apart within said envelope to form a primary gap therebetween; means for connecting said cathode electrode and said anode electrode to a voltage source to establish an electric field in the vicinity of said primary gap; a trigger electrode located concentric within said apertured cathode electrode and comprising a cylindrical ceramic member having a charged film of gas-absorbing metal deposited upon the lateral surface thereof and scored circumferentially to provide a trigger gap between opposite portions of said scored film on either side of said circumferential scoring; means connecting one side of said trigger gap to said cathode electrode; means connecting the remaining side of said trigger gap to an external trigger electrode lead; means for connecting a source of pulsed voltage between said cathode electrode and said trigger electrode lead and means for heating said trigger electrode independently of said device.

References Cited in the file of this patent

UNITED STATES PATENTS

| | | |
|---|---|---|
| 2,456,854 | Arnott et al. | Dec. 21, 1948 |
| 2,640,952 | Swanson | June 2, 1953 |
| 2,708,247 | Bell | May 10, 1955 |